United States Patent
Al Buraiky et al.

(10) Patent No.: US 12,279,117 B2
(45) Date of Patent: Apr. 15, 2025

(54) EXTENDING NETWORK CONNECTIVITY FROM CORE NETWORK TO REMOTE MOBILE NETWORKS USING WIRELESS BROADBAND

(71) Applicant: Saudi Arabian Oil Company, Dhahran (SA)

(72) Inventors: Salah M. S. Al Buraiky, Dhahran (SA); Abdullah M. Alsaadan, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 247 days.

(21) Appl. No.: 17/810,730

(22) Filed: Jul. 5, 2022

(65) Prior Publication Data
US 2024/0015511 A1    Jan. 11, 2024

(51) Int. Cl.
H04W 12/08    (2021.01)
H04L 9/40    (2022.01)
(Continued)

(52) U.S. Cl.
CPC ......... *H04W 12/086* (2021.01); *H04L 63/162* (2013.01); *H04L 63/164* (2013.01); *H04L 63/18* (2013.01); *H04W 12/009* (2019.01)

(58) Field of Classification Search
CPC .................. H04W 12/086; H04W 12/009; H04L 63/162; H04L 63/164; H04L 63/18
See application file for complete search history.

(56) References Cited

U.S. PATENT DOCUMENTS 8,924,574 B2    12/2014    Alex et al.
9,877,354 B2    1/2018    Heller
(Continued)

FOREIGN PATENT DOCUMENTS

WO    2021034906 A1    2/2021
WO    WO-2022076995 A1 *    4/2022    ......... H04L 12/4604

OTHER PUBLICATIONS

Gaur el al., "IoT-Equipped UAV Communications with Seamless Vertical Handover" Aug. 2017, in 2017 IEEE Conference on Dependable and Secure Computing, IEEE, pp. 1-7 (Year: 2017).*
(Continued)

*Primary Examiner* — Harunur Rashid
(74) *Attorney, Agent, or Firm* — Leason Ellis LLP

(57) ABSTRACT

A method for extending connectivity from a core network to remote mobile networks includes: installing a security gateway between the core network and wireless broadband base stations located at a periphery of the core network; creating a virtual layer 2 (data link) overlay network interconnecting the broadband base stations; activating a local layer 3 (network) protocol between the security gateway and the core network; activating a sensor protocol between the security gateway and each remote mobile network, the sensor protocol being configured to use broadband communication through the broadband base stations when at least one broadband base station is in range of the remote mobile network, and otherwise use satellite communication; and providing each remote mobile network with a remote layer 3 protocol that uses the broadband communication until disconnected from the broadband base stations, and then uses the satellite communication until reconnected to one of the broadband base stations.

14 Claims, 2 Drawing Sheets

(51) Int. Cl.
*H04W 12/00* (2021.01)
*H04W 12/086* (2021.01)

(56) References Cited

U.S. PATENT DOCUMENTS

| | | | | |
|---|---|---|---|---|
| 2012/0014387 | A1* | 1/2012 | Dunbar | H04L 61/103 370/400 |
| 2017/0294957 | A1* | 10/2017 | Ravishankar | H04W 40/12 |
| 2018/0097888 | A1* | 4/2018 | Roy | H04L 43/028 |
| 2021/0384967 | A1* | 12/2021 | Durvasula | H04W 84/045 |
| 2023/0244764 | A1* | 8/2023 | Wise | G06F 21/16 726/26 |
| 2023/0412423 | A1* | 12/2023 | Krovatkina | H04L 45/76 |

OTHER PUBLICATIONS

Hossain et al.,. "Heterogeneous Wireless Access Networks: Architectures and Protocols." Springer New York, NY Sep. 18, 2008, pp. 1-475. (Year: 2008).*
International Search Report and Written Opinion in corresponding PCT Application No. PCT/US2023/069462 mailed Sep. 19, 2023.
Al Buraiky, Salah M. S.; Mobile IPV6 with Linux; http://www.linuxjournal.com/magazine/mobile-ipv6-linux; Print and Online: Linux Journal, Issue 169, May 2008, 16 pages.
Ed C. Perkins, et al.; Internet Engineering Task Force; Request for Comments 6275, Mobility Support in IPv6, www.ietf.org/rfc/rfc6275.txt (2011); 146 pages.
D. Katz, et al.; Internet Engineering Task Force; Request for Comments 5880, Bidirectional Forwarding Detection (BFD), www.ietf.org/rfc/rfc5880.txt (2010); 43 pages.
K. Leung, et al.; Internet Engineering Task Force; Request for Comments 5177, Network Mobility (NEMO) Extensions for Mobile IPV4, www.ietf.org/rfc/rfc5177.txt (2008); 23 pages.

* cited by examiner

Start
↓

Install security gateway between core network and plurality of broadband base stations located at periphery of core network, broadband base stations wirelessly communicate with corresponding remote base station in each remote mobile network
210

↓

Create virtual layer 2 (data link) overlay network interconnecting broadband base stations
220

↓

Activate local layer 3 (network) protocol between security gateway and core network
230

↓

Activate sensor protocol between security gateway and each remote mobile network, sensor protocol is configured to, for each remote mobile network and corresponding remote base station:
- Use wireless broadband communication through broadband base stations to remote base station when at least one broadband base station is in range of remote base station
- Use satellite communication between core network and remote mobile network when no broadband base station is in range of remote base station

240

↓

Provide each remote mobile network with remote layer 3 protocol that uses wireless broadband communication until disconnected from all broadband base stations, then uses satellite communication while no broadband base station is connected to corresponding remote base station of remote mobile network
250

↓

End

EXTENDING NETWORK CONNECTIVITY FROM CORE NETWORK TO REMOTE MOBILE NETWORKS USING WIRELESS BROADBAND

FIELD OF THE DISCLOSURE

The present disclosure relates in general to wireless network connectivity and in particular to extending network connectivity from a core network to one or more remote mobile networks using wireless broadband.

BACKGROUND OF THE DISCLOSURE

Network connectivity is essential to enterprise operations in the office and in the field. Modern enterprises expect connectivity to be seamless and continuously available, even while users move locally (e.g., micromobility) or globally (e.g., macromobility). Early data network protocols including Internet Protocol (IP) assume end-points with fixed locations. With these early protocols, users on the move are forced to change their addresses and terminate their ongoing application sessions (such as web browsing or Voice over IP sessions). Satellite communication can address some of these problems. However, satellite-based solutions have their own problems. While satellite communication provides global network mobility, it comes with high capital and operational costs. It also presents security concerns since the satellite network provider is often a third party. In addition, satellite communication limits bandwidth scalability since bandwidth upgrades must be requested from the satellite provider no matter how fast the enterprise's equipment is.

It is in regard to these and other problems in the art that the present disclosure is directed to provide a technical solution for extending network connectivity from a core network to one or more remote mobile networks using wireless broadband. The present disclosure is also directed to provide a technical solution for scalable site mobility through secure VPN (Virtual Private Network) over P2MP (point-to-multipoint) wireless links.

SUMMARY OF THE DISCLOSURE

According to a first aspect of the disclosure, a method for extending network connectivity from a core network to one or more remote mobile networks using wireless broadband is provided. The method comprises: installing a security gateway between the core network and a plurality of broadband base stations located at a periphery of the core network, the broadband base stations for wirelessly communicating with a corresponding remote transceiver (or receiver or remote base station, all of which are used interchangeably throughout) in each remote mobile network; creating a virtual layer 2 (data link) overlay network interconnecting the broadband base stations; activating a local layer 3 (network) protocol between the security gateway and the core network; and activating a sensor protocol between the security gateway and each remote mobile network. The sensor protocol is configured to, for each remote mobile network and corresponding remote transceiver, use wireless broadband communication through the broadband base stations to the remote transceiver when at least one of the broadband base stations is in range of the remote transceiver, and use satellite communication between the core network and the remote mobile network when none of the broadband base stations are in range of the remote transceiver. The method further includes providing each remote mobile network with a remote layer 3 protocol that uses the wireless broadband communication until disconnected from all of the broadband base stations, and then uses the satellite communication while none of the broadband base stations are connected to the corresponding remote transceiver of the remote mobile network.

In an embodiment consistent with the above, the virtual layer 2 overlay network comprises a virtual private local area network (LAN) service (VPLS) or an Ethernet Virtual Private Network (EVPN).

In an embodiment consistent with the above, the security gateway comprises a firewall and an intrusion prevention system (IPS).

In an embodiment consistent with the above, the sensor protocol comprises Bidirectional Forwarding Detection (BFD) or Open Shortest Path First (OSPF).

In an embodiment consistent with the above, the wireless broadband communication of the remote layer 3 protocol comprises a point-to-multipoint (P2MP) communication protocol.

In an embodiment consistent with the above, the method further comprises: configuring the virtual layer 2 overlay network to include multiple Virtual Local Area Networks (VLANs); assigning the corresponding remote transceiver of each remote mobile network to a corresponding VLAN from among the multiple VLANs; and configuring the broadband base stations to support the multiple VLANs through asymmetric VLAN tagging.

In an embodiment consistent with the above, for each remote mobile network, the satellite communication is between an internal very-small-aperture terminal (VSAT) gateway at the periphery of the core network and a geosynchronous or geostationary satellite, and between the satellite and a remote VSAT gateway in the remote mobile network.

In an embodiment consistent with the above, the method further comprises: installing a satellite security gateway between the core network and the internal VSAT gateway; and activating an internal layer 3 protocol between the satellite security gateway and the core network.

According to another aspect of the disclosure, a system for extending network connectivity from a core network to one or more remote mobile networks using wireless broadband through a plurality of broadband base stations located at a periphery of the core network. The broadband base stations are for communicating with a corresponding remote transceiver in each remote mobile network. The system comprises: at least one processing circuit; and at least one non-transitory storage device storing instructions thereon that, when executed by the at least one processing circuit, cause the at least one processing circuit to: activate a security gateway between the core network and the broadband base stations located at a periphery of the core network; create a virtual layer 2 (data link) overlay network interconnecting the broadband base stations; activate a local layer 3 (network) protocol between the security gateway and the core network; and activate a sensor protocol between the security gateway and each remote mobile network. The sensor protocol is configured to, for each remote mobile network and corresponding remote transceiver, use wireless broadband communication through the broadband base stations to the remote transceiver when at least one of the broadband base stations is in range of the remote transceiver, and use satellite communication between the core network and the remote mobile network when none of the broadband base stations are in range of the remote transceiver. The instructions, when executed by the at least one processing circuit, cause the at least one processing circuit to further provide each remote mobile network with a remote layer 3 protocol that uses the wireless broadband communication until disconnected from all of the broadband base stations, and then uses the satellite communication while none of the broadband base stations are connected to the corresponding remote transceiver of the remote mobile network.

In an embodiment consistent with the system described above, the virtual layer 2 overlay network comprises a virtual private local area network (LAN) service (VPLS) or an Ethernet Virtual Private Network (EVPN).

In an embodiment consistent with the system described above, the security gateway comprises a firewall and an intrusion prevention system (IPS).

In an embodiment consistent with the system described above, the sensor protocol comprises Bidirectional Forwarding Detection (BFD) or Open Shortest Path First (OSPF).

In an embodiment consistent with the system described above, the wireless broadband communication of the remote layer 3 protocol comprises a point-to-multipoint (P2MP) communication protocol.

In an embodiment consistent with the system described above, the instructions, when executed by the at least one processing circuit, further cause the at least one processing circuit to: configure the virtual layer 2 overlay network to include multiple Virtual Local Area Networks (VLANs); assign the corresponding remote transceiver of each remote mobile network to a corresponding VLAN from among the multiple VLANs; and configure the broadband base stations to support the multiple VLANs through asymmetric VLAN tagging.

In an embodiment consistent with the system described above, for each remote mobile network, the satellite communication is between an internal very-small-aperture terminal (VSAT) gateway at the periphery of the core network and a geosynchronous or geostationary satellite, and between the satellite and a remote VSAT gateway in the remote mobile network; and the instructions, when executed by the at least one processing circuit, further cause the at least one processing circuit to: activate a satellite security gateway between the core network and the internal VSAT gateway; and activate an internal layer 3 protocol between the satellite security gateway and the core network.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 2 is a flow diagram of an example method for extending network connectivity from a core network to one or more remote mobile networks using wireless broadband, according to an embodiment.

It is noted that the drawings are illustrative and not necessarily to scale, and that the same or similar features have the same or similar reference numerals throughout.

Figure 1:
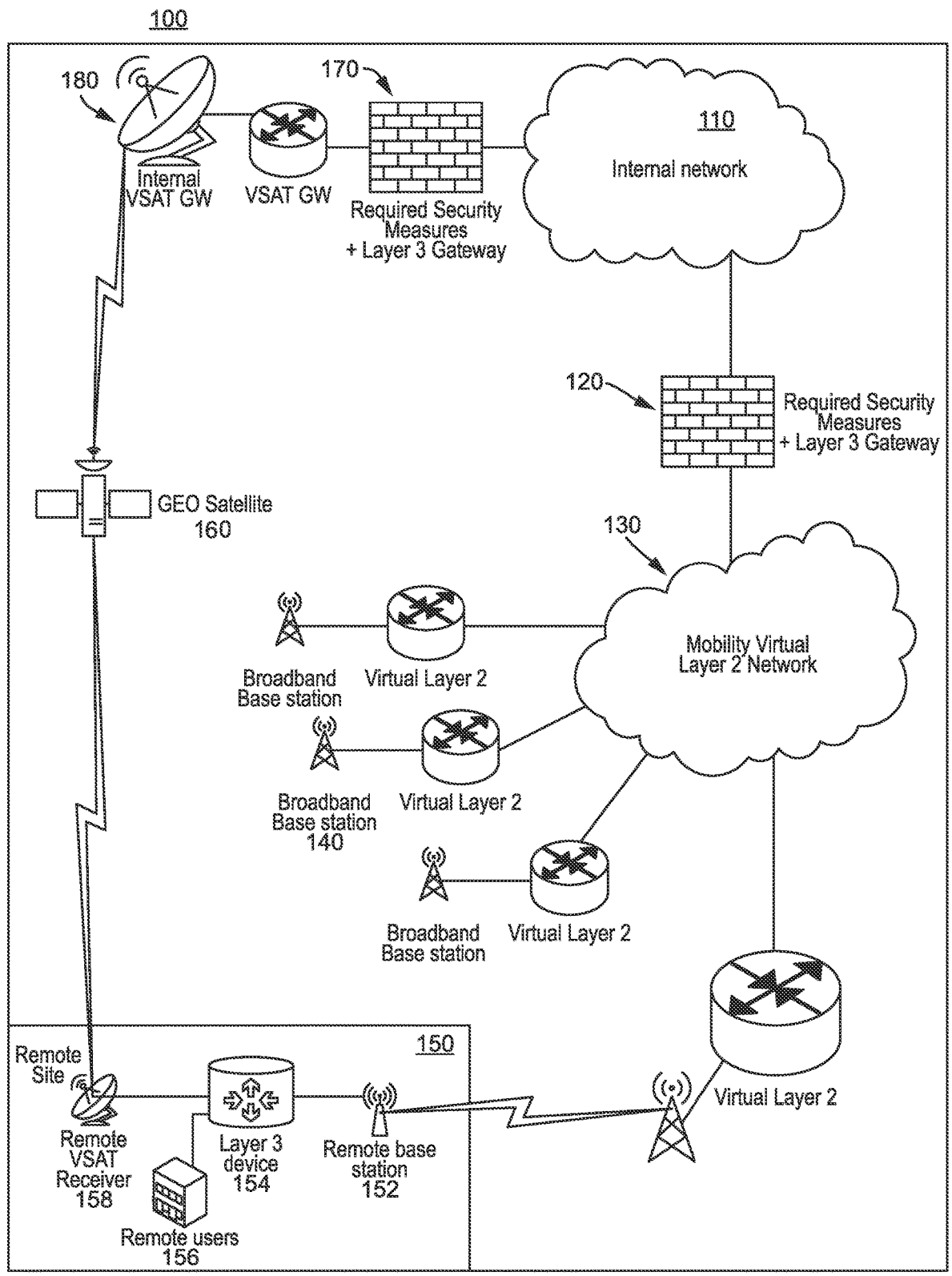
FIG. 1 is a schematic diagram of an example network system for extending network connectivity from a core network to one or more remote mobile networks using wireless broadband, according to an embodiment.

DETAILED DESCRIPTION OF CERTAIN
EMBODIMENTS OF THE DISCLOSURE

Example embodiments of the present disclosure are directed to techniques for extending network connectivity from a core network to one or more remote mobile networks using wireless broadband. Further embodiments are directed to techniques for scalable site mobility through secure VPN (Virtual Private Network) over P2MP (point-to-multipoint) wireless links. Still further embodiments are directed to techniques for combining layer 2 (data link) overlay, Bidirectional Forwarding Detection (BFD) or Open Shortest Path First (OSPF), and multiple Virtual Local Area Network (virtual LAN, or VLAN) tagging to implement seamless and scalable enterprise-level Network Mobility (NEMO) for mobile platforms. In some such embodiments, the layer 2 overlay is a multiprotocol label switching (MPLS) based virtual private local area network service (VPLS) or Ethernet VPN (EVPN) technology. Yet still further embodiments are directed to enabling mobility of remote networks (such as on drilling rigs) while maintaining network connectivity to a home (core) network, and doing so in a manner that seamlessly scales with the amount of remote network traffic. Additional embodiments are directed to providing wireless broadband connectivity for remote rigs (such as remote drilling rigs or other remote mobile platforms).

As discussed above, supporting network connectivity to remote networks (such as on drilling rigs) can be challenging. Many networking technologies drop application sessions when applied to mobile networks. While satellite-based communication may offer a temporary solution (such as when the roaming domain is outside of the reach of the enterprise's land-based communication coverage), the cost of such communication can be prohibitive if used for all of the remote network traffic.

It is in regard to these and other problems that example embodiments of the present disclosure are directed to techniques for extending network connectivity from a core network to one or more remote mobile networks using wireless broadband communication technology. With the advent of portable devices, an extension of IP, called Mobile IP (MIP), was developed to enable devices to move while keeping their IP addresses (whether they are IPv4 or IPv6) and their sessions intact. A more advanced specification called Network Mobility (NEMO) was developed later to enable an entire network (such as on a train or a drilling rig) to move while maintaining its address space without the need for expensive and specialized technology such as satellite-based communication. Such solutions can be more cost effective and better performing alternatives when a mobile network is roaming within an area where the enterprise has communication infrastructure, such as wireless broadband base stations. However, such solutions introduce significant signaling and encapsulation complexity, making them less than ideal. Accordingly, in some embodiments, terrestrial technologies such as packet-based wireless broadband offer a more cost-effective solution, and can also provide scalable bandwidth and feature better security.

In some embodiments, a method for platforms such as drilling rigs hosting mobile networks is provided. The method allows the platforms to move within their operational areas without having to depend on expensive and bandwidth-limited satellite communication and without incurring the signaling and encapsulation complexity of schemes such as NEMO, MIP, or SDN (Software Defined Network) based solutions. In some such embodiments, satellite communication is still used as a lower bandwidth backup solution in conjunction with the terrestrial solutions presented. In some embodiments, secure and scalable wireless broadband connectivity is provided for exploration rigs.

In example embodiments, widely supported Internet Engineering Task Force (IETF) and Institute of Electrical and Electronics Engineers (IEEE) features are used as building blocks. This includes a layer 2 overlay such as Virtual Private LAN Service (VPLS) or Ethernet Virtual Private Network (EVPN), Virtual Local Area Network (VLAN) tagging, and Bidirectional Forwarding Detection (BFD) or Open Shortest Path First (OSPF). In some such embodiments, these are combined to allow a mobile network (such as a drilling rig) to move around a core network and continue being connected as long as the mobile network is within range of the core network, such as within range of wireless base stations (e.g., transceivers) of the core network.

In some embodiments, the moving platform is connected to the core network via unlicensed point-to-point (P2P) or point-to-multipoint (P2MP) broadband wireless technology. Radio receivers and transceivers on the moving platforms connect terrestrially (e.g., by wireless broadband communication) to fixed base stations installed at the core network's perimeter or periphery. By "periphery," it is meant with respect to connectivity with the core network, and not necessarily physical proximity. For example, periphery can include transceivers that are separated by a firewall from the core network. To allow mobility of the remote networks or platforms, in some embodiments, base stations are uplinked to the same layer 2 (e.g., data link layer) overlay network at the periphery of the core network. This is so that the (fixed) base stations can connect (mobile) receivers to the same subnet in order to avoid reconfiguration associated with a layer 3 (e.g., network layer) handover.

To achieve this, in some embodiments, all base stations (e.g., fixed base stations, broadband base stations, or other types of base stations) are part of the same layer 2 overlay. In some such embodiments, this is accomplished by using a scalable layer 2 technology such as VPLS or EVPN. Using the layer 2 overlay simplifies isolating the moving platforms from the rest of the core network, since a central security device or gateway can be placed between the layer 2 overlay LAN sites and the rest of the core network. In some such embodiments, a firewall and an IPS (intrusion prevention system) is placed between the layer 2 overlay hosting the moving platforms and the rest of the core network.

In some embodiments, to scale layer 2 overlay deployment, multiple mobile platforms (e.g., drilling rigs) and their corresponding receivers (strictly speaking, these are transceivers, such as remote base stations or mobile base stations, but for ease or description, these terms are used interchangeably throughout) are distributed among multiple VLANs (e.g., each remote or mobile base station being assigned to a separate VLAN), and consequently multiple subnets, thus limiting the size of the broadcast domain to which each receiver belongs. In some such embodiments, the base stations (e.g., broadband base stations, fixed base stations, and the like) are configured (e.g., programmed) to accommodate all (remote) receivers, no matter what VLAN each receiver may belong to, by enabling asymmetric VLAN tagging. Here, each receiver is configured (such as programmed) to send traffic singly-tagged with their specific VLAN (and consequently VPLS or EVPN instance) they belong to, while on the other side of the link, the base station's broadband wireless link is multiply tagged with all VLAN tags utilized by the various receivers. That is, the base station is configured to accept any VLAN tag that may be used by a receiver. This allows each remote receiver (transceiver) to wirelessly communicate with any fixed broadband base station that is part of the same layer 2 overlay at a periphery of the core network.

In addition to enabling scalable network mobility, in some embodiments, mobility detection (e.g., detecting which mobile networks are in wireless broadband communication with which broadband base stations) is provided through Bidirectional Forwarding Detection (BFD) or Open Shortest Path First (OSPF) protocol coupled with static routes configured on the core network. In some such embodiments, these static routes point towards the routers acting as gateways to the VLANs hosting the base stations. Mobility detection ensures that the routes disappear when the mobile network is not reachable via wireless broadband and allows backup routes (such as satellite-based routes) to be activated upon the deletion of the wireless broadband routes.

In example embodiments, the above-described techniques allow an entire remote mobile network to move within a wide geographic area without the need for reconfiguration, while being centrally secured. They also allow for movement detection and support multi-technology redundancy. In some embodiments, these techniques are independent from the specifics of the radio or wireless technology (e.g., Wi-Fi, proprietary wireless broadband, to name a few), can support any layer 3 protocol (e.g., IPv4, IPv6, and the like) and require no modification for existing communication software and hardware. In some embodiments, Network Mobility is achieved scalably and securely without mobility-specific support in routers or other network devices and without reliance on satellite communication, while being able at the same time to employ satellite communication as a backup if available.

Other solutions to the mobility problem may use Network Address Translation (NAT). However, example embodiments have no reliance on NAT, which makes for a more scalable deployment since NAT adds complexity and storage overhead to the implementation. Still other solutions to the mobility problem may use a combination of Mobile IP and Proxy Mobile Node capability. However, example embodiments have no reliance on Proxy Mobile Node (PMN), which makes for a more cost effective and more scalable deployment since Mobile IP and PMN add complexity and require additional software or hardware components to implement. In summary, other solutions often require special mobility-specific support on network communication devices (such as routers). By comparison, example embodiments provide scalable network mobility that only utilizes the most basic routing and switching capabilities, which are available on any standard platform.

According to example embodiments, the methodology used can scale with any platform that supports basic networking functionality. Unlike many other solutions, example embodiments have no dependency on mobility extension specifications such as Mobile IP. Depending on existing mobility specifications requires special mobility-specific software on communications devices (such as routers), which limits the router software and hardware options that can be used when mobility is required. Existing mobility-specific software and hardware also adds signaling and encapsulation complexity. They add signaling complexity because they rely on registration and handover messages; they add encapsulation complexity because they rely on tunneling. Example embodiments provide a simpler solution that can be used on any platform, even those that have no mobility-specific support. In short, example embodiments provide higher mobility at a lower cost (compared to other solutions) while maintaining the same level of availability, redundancy, and security.

FIG. 1 is a schematic diagram of an example network system 100 for extending network connectivity from a core (internal) network 110 to one or more remote mobile networks 150 using wireless broadband, according to an embodiment. FIG. 1 illustrates a broadband solution to serve mobile rigs and other moving remote sites 150. The solution allows for secure mobile connectivity for rigs and other platforms on the move. It provides the required security (such as firewall 120) for the internal network 110 without limiting mobility, while allowing satellite communication, such as very-small-aperture terminal (VSAT), to be used as a backup. Wireless broadband provides higher bandwidth and lower latency inside a coverage area provided by broadband base stations 140. VSAT, in comparison, provides lower bandwidth with higher latency when outside the broadband coverage area.

In further detail with reference to FIG. 1, multiple functions of the network system 100 are combined to work with a mobility solution for remote mobile networks 150. The solution extends network connectivity from the core network 110 to the remote mobile networks 150 using wireless broadband through the broadband base stations 140. The base stations 140 are located at a periphery of the core network 110. A security gateway 120, such as a combination of a firewall and an intrusion prevention system (IPS), is installed between the core network 110 and the broadband base stations 140. In addition, a virtual layer 2 (such as VPLS or EVPN) connectivity 130 is created between (e.g., to interconnect) all the broadband base stations 140. Further, a layer 3 protocol is activated between the security gateway 120 and the internal network 110.

Continuing, a sensor protocol (such as BFD or OSPF) is activated between the security gateway 120 and the remote site 150 to use wireless broadband communication (such as when the remote site 150 is within broadcast range of one or more of the broadband base stations 140) or to use VSAT (such as through geostationary or geosynchronous satellite 160) when none of the broadband base stations 140 are in wireless broadband range of the remote site 150. In addition, the remote site 150 (including remote users 156) is provided with a layer 3 protocol (such as layer 3 device 154) that utilizes wireless broadband (such as through remote base station 152) until failure in the connection is detected (e.g., through BFD or OSPF detecting the remote base 152 is no longer in range of any of the broadband base stations 140). At this point, satellite communication is enabled through internal VSAT gateway 180 to geo satellite 160 and remote VSAT receiver 158. A similar security gateway 170 (e.g., firewall) is installed between the core network 110 and the internal VSAT gateway 180. Such a solution can scale to dozens or even hundreds or more remote sites 150 and wireless broadband base stations 140.

FIG. 2 is a flow diagram of an example method 200 for extending network connectivity from a core network (such as internal network 110) to one or more remote mobile networks (such as remote site 150) using wireless broadband, according to an embodiment. Portions of the method 200 can be automated under the control of one or more electronic circuits (such as processing circuits or microprocessors), which are configured (e.g., by code, such as programmed, by custom logic, as in configurable logic gates, or the like) to carry out some or all of the steps of the method 200.

Some or all of the method 200 can be performed using components and techniques illustrated in FIG. 1. In addition, portions of this and other methods or processes disclosed herein can be performed on or using special logic, such as custom or preprogrammed control logic devices, circuits, or processors, as in a Programmable Logic Circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause portions of the method 200 (or other disclosed method or process) to be carried out. It should be noted that in other embodiments, the order of the operations can be varied, and that some of the operations can be omitted. Some of the method 200 can also be performed using logic, circuits, or processors located on or in electrical communication with a processing circuit configured by code to carry out these portions of the method 200.

In the method 200 processing begins with the step of installing 210 a security gateway (such as security gateway 120 between the core network and a plurality of broadband base stations (such as broadband base stations 140) located at a periphery of the core network. The broadband base stations provide for wireless communication with a corresponding remote transceiver (such as remote base station 152) in each remote mobile network. The method 200 further includes the step of creating 220 a virtual layer 2 (data link) overlay network (such as mobility virtual layer 2 network 130) interconnecting the broadband base stations. In addition, the method 200 includes the step of activating 230 a local layer 3 (network) protocol between the security gateway and the core network.

Further, the method 200 includes the step of activating 240 a sensor protocol (such as BFD or OSPF) between the security gateway and each remote mobile network. The sensor protocol is configured (e.g., by code) to, for each remote mobile network and corresponding remote transceiver, use wireless broadband communication through the broadband base stations to the remote transceiver when at least one of the broadband base stations is in range of the remote transceiver, and otherwise use satellite communication (such as between internal VSAT gateway 180, geo satellite 160, and remote VSAT receiver 158) between the core network and the remote mobile network when none of the broadband base stations are in range of the remote transceiver. Finally, the method 200 includes the step of providing 250 each remote mobile network with a remote layer 3 protocol (such as with layer 3 device 154) that uses the wireless broadband communication until disconnected from all of the broadband base stations, and then uses the satellite communication while none of the broadband base stations are connected to the corresponding remote transceiver of the remote mobile network.

In an embodiment, the virtual layer 2 overlay network includes a virtual private local area network (LAN) service (VPLS) or an Ethernet Virtual Private Network (EVPN). In an embodiment, the security gateway includes a firewall and an intrusion prevention system (IPS). In an embodiment, the sensor protocol includes Bidirectional Forwarding Detection (BFD) or Open Shortest Path First (OSPF). In an embodiment, the wireless broadband communication of the remote layer 3 protocol includes a point-to-multipoint (P2MP) communication protocol. In an embodiment, the method 200 further includes the steps of configuring the virtual layer 2 overlay network to include multiple Virtual Local Area Networks (VLANs), assigning the corresponding remote transceiver of each remote mobile network to a corresponding VLAN from among the multiple VLANs, and configuring the broadband base stations to support the multiple VLANs through asymmetric VLAN tagging.

In an embodiment, for each remote mobile network, the satellite communication is between an internal very-small-aperture terminal (VSAT) gateway (such as internal VSAT gateway 180) at the periphery of the core network and a geosynchronous or geostationary satellite (such as geo satellite 160), and between the satellite and a remote VSAT gateway (such as remote VSAT receiver 158) in the remote mobile network. In an embodiment, the method further includes the steps of installing a satellite security gateway (such as satellite security gateway 170) between the core network and the internal VSAT gateway, and activating an internal layer 3 protocol between the satellite security gateway and the core network.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for extending network connectivity from a core network to one or more remote mobile networks using wireless broadband, the method comprising:
    installing a first security gateway between the core network and a plurality of broadband base stations located at a periphery of the core network, the broadband base stations for wirelessly communicating with a corresponding remote transceiver in each remote mobile network;
    creating a virtual layer 2 (data link) overlay network interconnecting the broadband base stations;
    activating a local layer 3 network protocol between the first security gateway and the core network, wherein the local layer 3 network protocol is compliant with the Open Systems Interconnection (OSI) model;
    activating a sensor protocol between the first security gateway and each remote mobile network, the sensor protocol being configured to, for each remote mobile network and corresponding remote transceiver,
        use wireless broadband communication through the broadband base stations to the remote transceiver when at least one of the broadband base stations is in range of the remote transceiver, and
        use satellite communication between the core network and the remote mobile network when none of the broadband base stations are in range of the remote transceiver, wherein for each remote mobile network, the satellite communication is between an internal very-small-aperture terminal (VSAT) gateway at the periphery of the core network and a geosynchronous or geostationary satellite, and between the satellite and a remote VSAT gateway in the remote mobile network;
    providing each remote mobile network with a remote layer 3 network protocol that uses the wireless broadband communication until disconnected from all of the broadband base stations, and then uses the satellite communication while none of the broadband base stations are connected to the corresponding remote transceiver of the remote mobile network, wherein the remote layer 3 network protocol is compliant with the Open Systems Interconnection (OSI) model; and
    installing a satellite security gateway between the core network and the internal VSAT gateway.

2. The method of claim 1, wherein the virtual layer 2 overlay network comprises a virtual private local area network (LAN) service (VPLS) or an Ethernet Virtual Private Network (EVPN).

3. The method of claim 1, wherein the first security gateway comprises a firewall and an intrusion prevention system (IPS).

4. The method of claim 1, wherein the sensor protocol comprises Bidirectional Forwarding Detection (BFD) or Open Shortest Path First (OSPF).

5. The method of claim 1, wherein the wireless broadband communication of the remote layer 3 protocol comprises a point-to-multipoint (P2MP) communication protocol.

6. The method of claim 1, further comprising:
configuring the virtual layer 2 overlay network to include multiple Virtual Local Area Networks (VLANs);
assigning the corresponding remote transceiver of each remote mobile network to a corresponding VLAN from among the multiple VLANs; and
configuring the broadband base stations to support the multiple VLANs through asymmetric VLAN tagging.

7. The method of claim 1, further comprising:
activating an internal layer 3 network protocol between the satellite security gateway and the core network, wherein the internal layer 3 network protocol is compliant with the Open Systems Interconnection (OSI) model.

8. A system for extending network connectivity from a core network to one or more remote mobile networks using wireless broadband through a plurality of broadband base stations located at a periphery of the core network, the broadband base stations for communicating with a corresponding remote transceiver in each remote mobile network, the system comprising:
at least one processing circuit; and
at least one non-transitory storage device storing instructions thereon that, when executed by the at least one processing circuit, cause the at least one processing circuit to:
activate a first security gateway between the core network and the broadband base stations located at a periphery of the core network;
create a virtual layer 2 (data link) overlay network interconnecting the broadband base stations;
activate a local layer 3 network protocol between the first security gateway and the core network, wherein the local layer 3 network protocol is compliant with the Open Systems Interconnection (OSI) model;
activate a sensor protocol between the first security gateway and each remote mobile network, the sensor protocol being configured to, for each remote mobile network and corresponding remote transceiver,
use wireless broadband communication through the broadband base stations to the remote transceiver when at least one of the broadband base stations is in range of the remote transceiver, and
use satellite communication between the core network and the remote mobile network when none of the broadband base stations are in range of the remote transceiver, wherein for each remote mobile network, the satellite communication is between an internal very-small-aperture terminal (VSAT) gateway at the periphery of the core network and a geosynchronous or geostationary satellite, and between the satellite and a remote VSAT gateway in the remote mobile network;
provide each remote mobile network with a remote layer 3 network protocol that uses the wireless broadband communication until disconnected from all of the broadband base stations, and then uses the satellite communication while none of the broadband base stations are connected to the corresponding remote transceiver of the remote mobile network, wherein the remote layer 3 network protocol is compliant with the Open Systems Interconnection (OSI) model; and
install a satellite security gateway between the core network and the internal VSAT gateway.

9. The system of claim 8, wherein the virtual layer 2 overlay network comprises a virtual private local area network (LAN) service (VPLS) or an Ethernet Virtual Private Network (EVPN).

10. The system of claim 8, wherein the first security gateway comprises a firewall and an intrusion prevention system (IPS).

11. The system of claim 8, wherein the sensor protocol comprises Bidirectional Forwarding Detection (BFD) or Open Shortest Path First (OSPF).

12. The system of claim 8, wherein the wireless broadband communication of the remote layer 3 protocol comprises a point-to-multipoint (P2MP) communication protocol.

13. The system of claim 8, wherein the instructions, when executed by the at least one processing circuit, further cause the at least one processing circuit to:
configure the virtual layer 2 overlay network to include multiple Virtual Local Area Networks (VLANs);
assign the corresponding remote transceiver of each remote mobile network to a corresponding VLAN from among the multiple VLANs; and
configure the broadband base stations to support the multiple VLANs through asymmetric VLAN tagging.

14. The system of claim 8, wherein:
the instructions, when executed by the at least one processing circuit, further cause the at least one processing circuit to:
activate the satellite security gateway between the core network and the internal VSAT gateway; and
activate an internal layer 3 network protocol between the satellite security gateway and the core network, wherein the internal layer 3 network protocol is compliant with the Open Systems Interconnection (OSI) model.

* * * * *